United States Patent
Grass et al.

(10) Patent No.: US 12,180,019 B1
(45) Date of Patent: Dec. 31, 2024

(54) BIN SWEEP APPARATUS EFFECTIVE IN TWO DIRECTIONS OF MOVEMENT

(71) Applicants: Andrew Grass, Tea, SD (US); John Steever, Lennox, SD (US); Elliott Strain, Sioux Falls, SD (US)

(72) Inventors: Andrew Grass, Tea, SD (US); John Steever, Lennox, SD (US); Elliott Strain, Sioux Falls, SD (US)

(73) Assignee: Sioux Steel Company, Sioux Falls, SD (US)

( * ) Notice: Subject to any disclaimer, the term of this patent is extended or adjusted under 35 U.S.C. 154(b) by 232 days.

(21) Appl. No.: 17/987,075

(22) Filed: Nov. 15, 2022

(51) Int. Cl.
*B65G 65/42* (2006.01)
*B65G 65/46* (2006.01)

(52) U.S. Cl.
CPC .................................. *B65G 65/466* (2013.01)

(58) Field of Classification Search
None
See application file for complete search history.

(56) References Cited

U.S. PATENT DOCUMENTS

| | | | | |
|---|---|---|---|---|
| 3,356,235 A | * | 12/1967 | Laidig | B65G 65/466 414/311 |
| 3,817,409 A | * | 6/1974 | Weaver | A01F 25/2018 414/311 |
| 3,977,543 A | * | 8/1976 | Weaver | A01F 25/2018 414/311 |
| 4,057,151 A | * | 11/1977 | Weaver | A01F 25/2018 414/311 |
| 4,618,304 A | * | 10/1986 | Finger | B65G 65/425 222/242 |
| 4,619,577 A | | 10/1986 | Swanson | |
| 6,254,329 B1 | | 7/2001 | Sukup | |
| 9,156,622 B1 | | 10/2015 | Chaon | |
| 9,288,946 B1 | * | 3/2016 | Schuld | A01F 25/2018 |
| 9,290,335 B1 | * | 3/2016 | Witt | B65G 65/4836 |
| 9,809,402 B2 | * | 11/2017 | Nelson | B65G 65/4836 |
| 10,238,042 B2 | | 3/2019 | Ahlen | |
| 10,322,892 B2 | | 6/2019 | Hoogestraat | |
| 10,676,294 B2 | * | 6/2020 | Harrenstein | B65G 65/4836 |
| 11,136,205 B2 | | 10/2021 | Gutwein | |
| 11,220,406 B2 | | 1/2022 | Hoogestraat | |

(Continued)

FOREIGN PATENT DOCUMENTS

| | | | | |
|---|---|---|---|---|
| CA | 2312068 | | 12/2001 | |
| CA | 3068594 A1 | * | 1/2019 | ......... A01F 25/2018 |
| CN | 113173369 B | * | 7/2022 | ............. B65G 19/18 |

*Primary Examiner* — Joseph A Dillon, Jr.
(74) *Attorney, Agent, or Firm* — Jeffrey A. Proehl; Woods, Fuller, Shultz & Smith, PC

(57) ABSTRACT

A system may include a bin sweep apparatus for moving particles across a floor surface of a storage bin with a forward side for orienting toward a primary direction of movement and a rearward side for orienting toward a secondary direction of movement for the sweep apparatus. The secondary direction may be oriented away from the primary direction. The sweep apparatus may include a housing segment and a paddle sweep assembly carried on the segment. The sweep assembly may include a plurality of interconnected paddles and an endless loop member on which the paddles are mounted. The sweep apparatus may be effective to move particles across the floor surface in the primary direction of movement and in the secondary direction of movement.

18 Claims, 13 Drawing Sheets

(56) References Cited

U.S. PATENT DOCUMENTS

| | | | |
|---|---|---|---|
| 11,267,664 B1* | 3/2022 | Bloemendaal | B65G 65/425 |
| 11,299,358 B1* | 4/2022 | Grass | B65G 65/425 |
| 11,337,374 B2* | 5/2022 | Olson | B65G 65/4836 |
| 11,618,639 B1* | 4/2023 | Grass | B65G 65/425 |
| | | | 414/217 |
| 2023/0391565 A1* | 12/2023 | Olson | B65G 65/4836 |

* cited by examiner

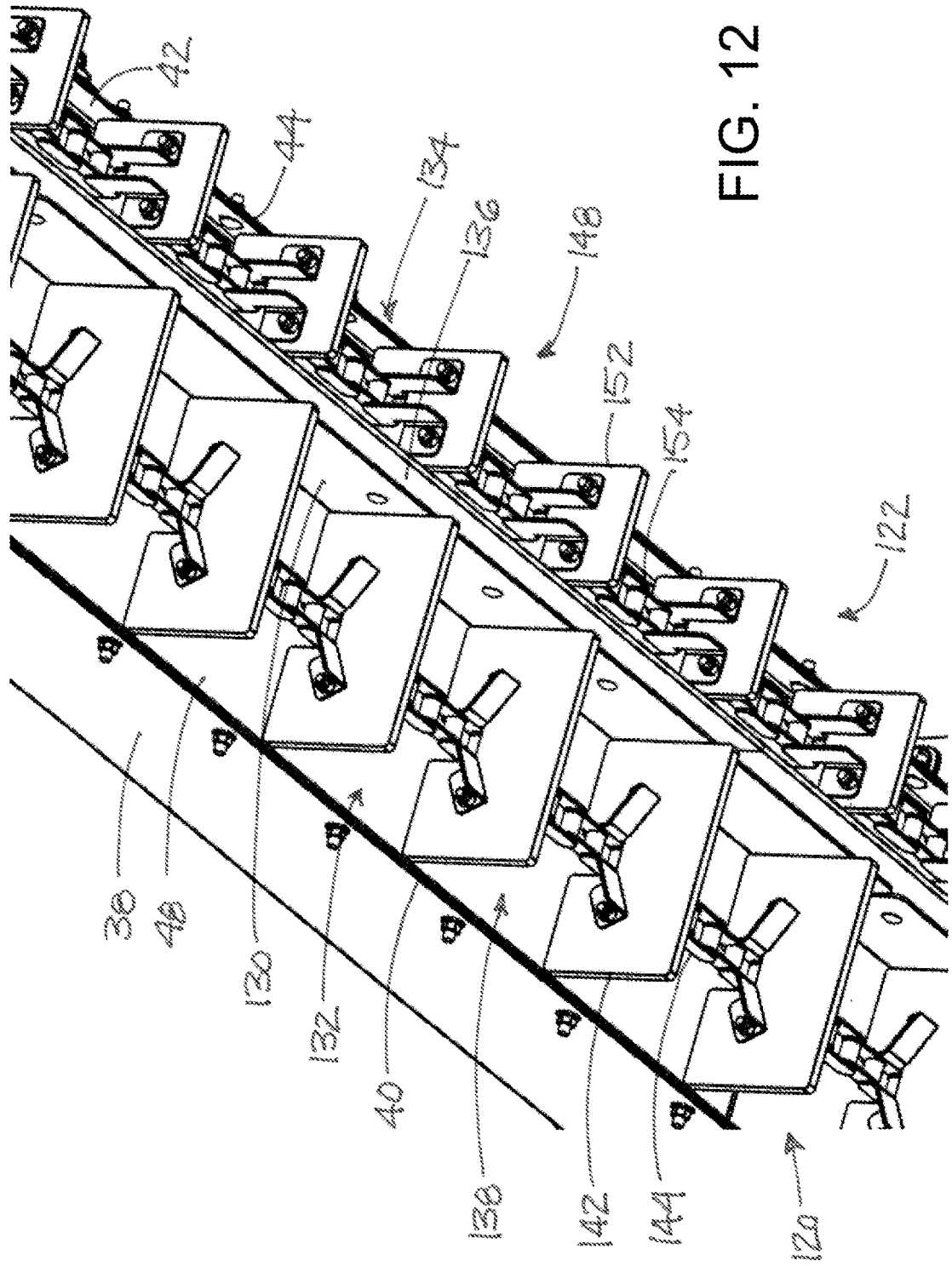

BIN SWEEP APPARATUS EFFECTIVE IN TWO DIRECTIONS OF MOVEMENT

BACKGROUND

Field

The present disclosure relates to bin sweep apparatus and more particularly pertains to a new bin sweep apparatus effective in two directions of movement for facilitating more efficient clearing of the contents of a storage bin.

SUMMARY

In some aspects, the present disclosure may relate to a system for moving particles across a floor surface of a storage bin. The system may comprise a bin sweep apparatus including at least two units arranged in a linear array with an inboard end for locating toward a central area of the bin and an outboard end for locating toward a periphery of the bin. The sweep apparatus may have a forward side for orienting toward a primary direction of movement for the sweep apparatus and a rearward side for orienting toward a secondary direction of movement for the sweep apparatus. The secondary direction of movement being oriented away from the primary direction of movement. The sweep apparatus may comprise a housing segment for each of the at least two units, and the housing segment of at least one of the units may comprise a forward wall positioned toward the forward side of the bin sweep apparatus and a rearward wall positioned toward the rearward side of the bin sweep apparatus. The sweep apparatus may also include a paddle sweep assembly carried on the housing segments of the at least two units. The paddle sweep assembly may comprise a plurality of interconnected paddles movable in a succession on a path along at least a portion of the sweep apparatus between the inboard and outboard ends, and an endless loop member having the plurality of paddles mounted thereon at spaced locations along the endless loop member. The endless loop member with mounted paddles may include an inbound extent moving toward the inboard end of the bin sweep apparatus and an outbound extent moving toward the outboard end of the bin sweep apparatus. The inbound extent may contact particles to move the particles toward the inboard end and the outbound extent may be out of contact with the particles, the inbound extent being located below the outbound extent. The sweep apparatus is effective to move particles across the floor surface of a bin in the primary direction of movement of the sweep apparatus and in the secondary direction of movement of the sweep apparatus.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 12 is a schematic perspective view of a portion of the underside of the illustrative bin sweep apparatus embodiment of FIG. 9.

DETAILED DESCRIPTION

Figure 1:
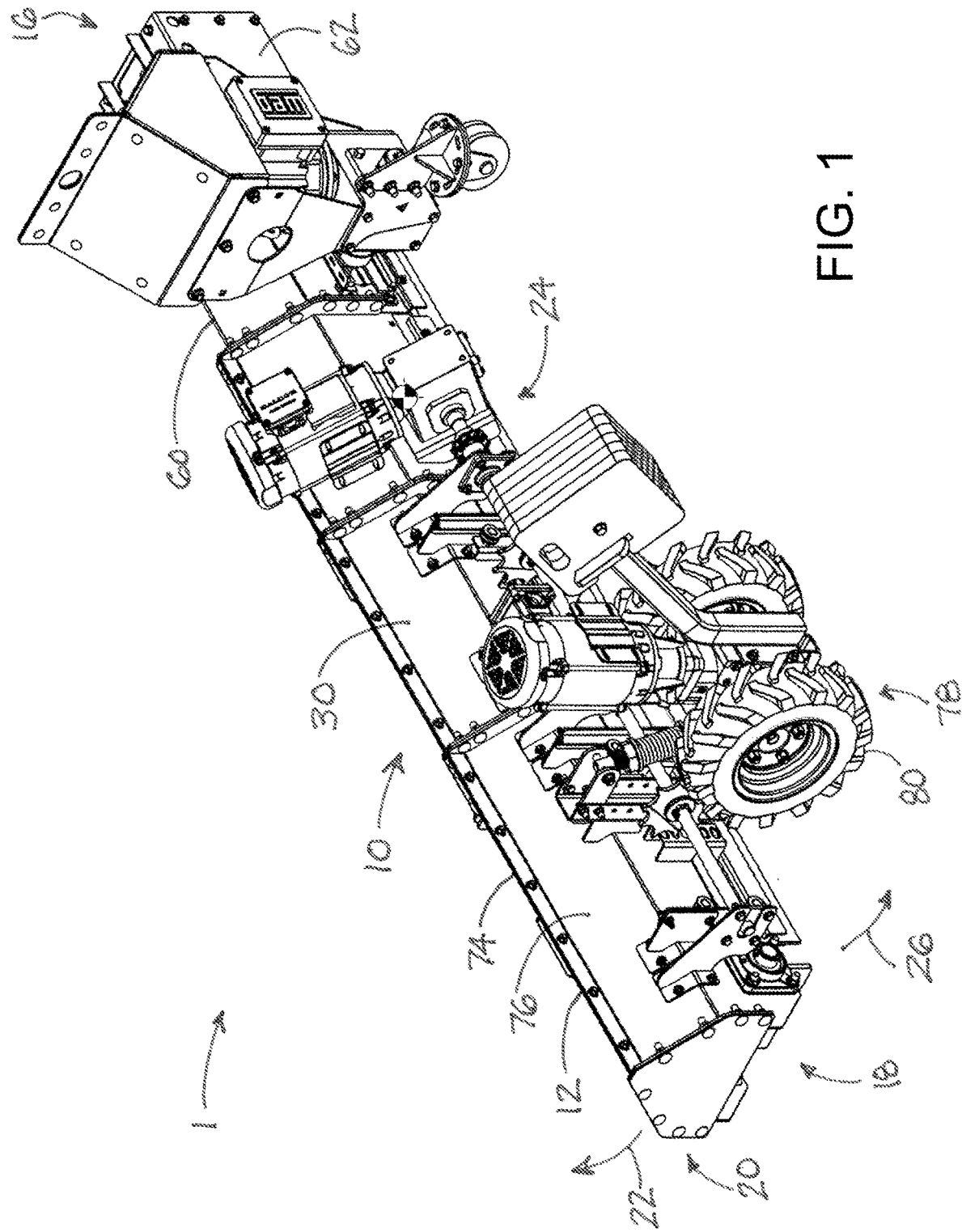
FIG. 1 is a schematic outer end perspective view of an illustrative embodiment of a new bin sweep apparatus which is effective in two directions of movement, according to the present disclosure.
Figure 2:
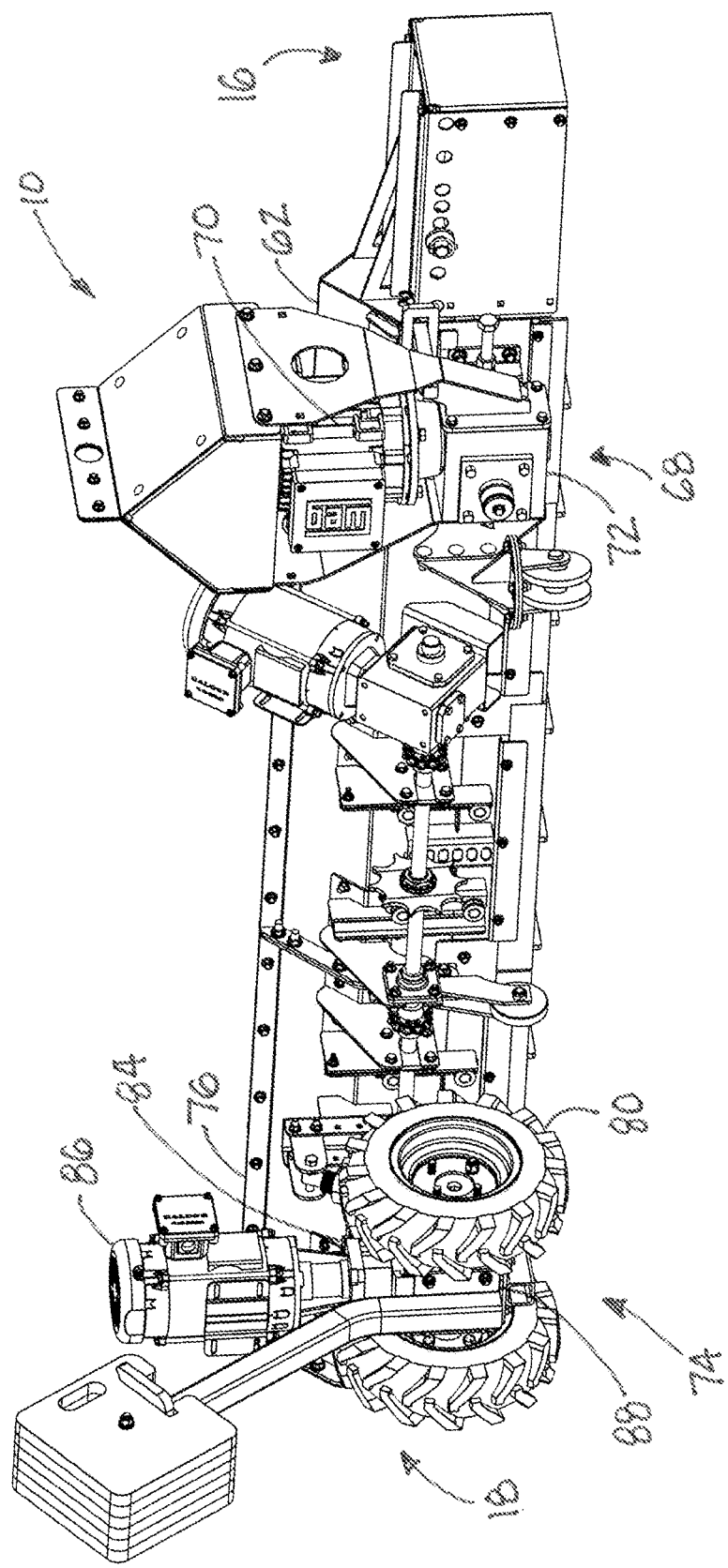
FIG. 2 is a schematic inner end perspective view of the illustrative embodiment of FIG. 1 of the bin sweep apparatus, according to the present disclosure.
Figure 3:
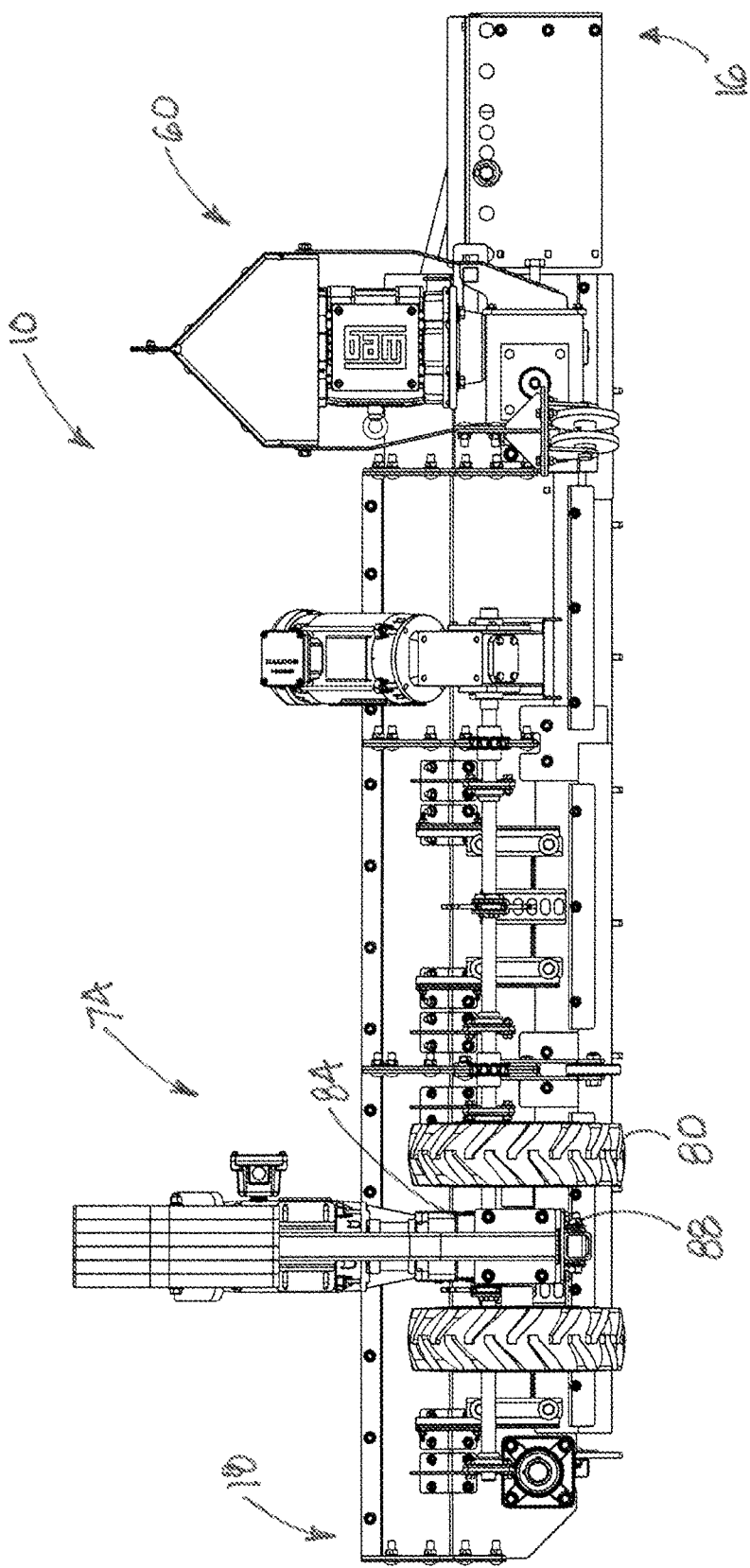
FIG. 3 is a schematic rear side view of the illustrative embodiment of FIG. 1 of the bin sweep apparatus, according to the present disclosure.
Figure 4A:
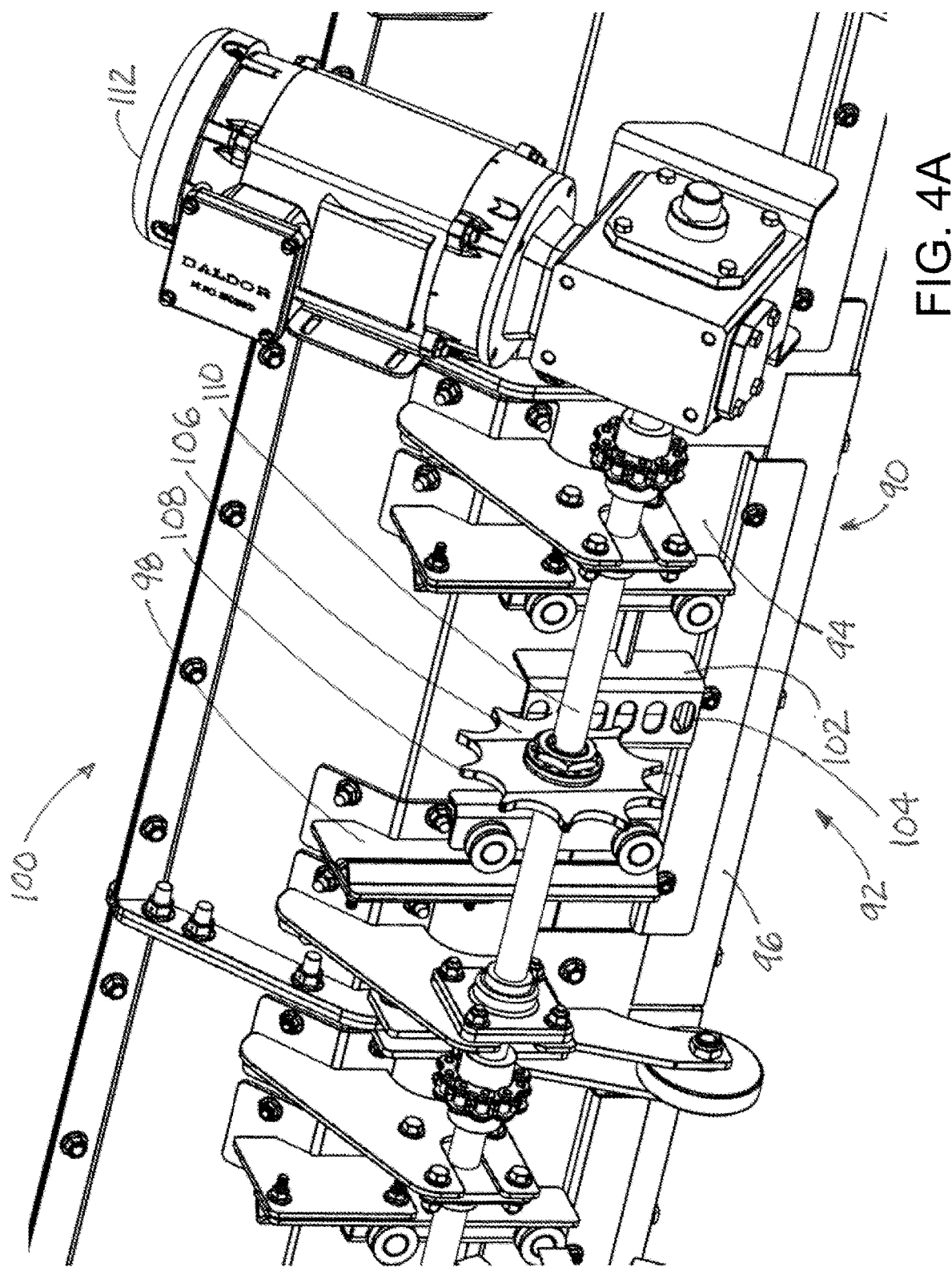
FIG. 4A is a schematic enlarged perspective view of a portion of the illustrative bin sweep apparatus embodiment of FIG. 1, with the movable section in the lowered position, according to an illustrative embodiment.
Figure 4B:
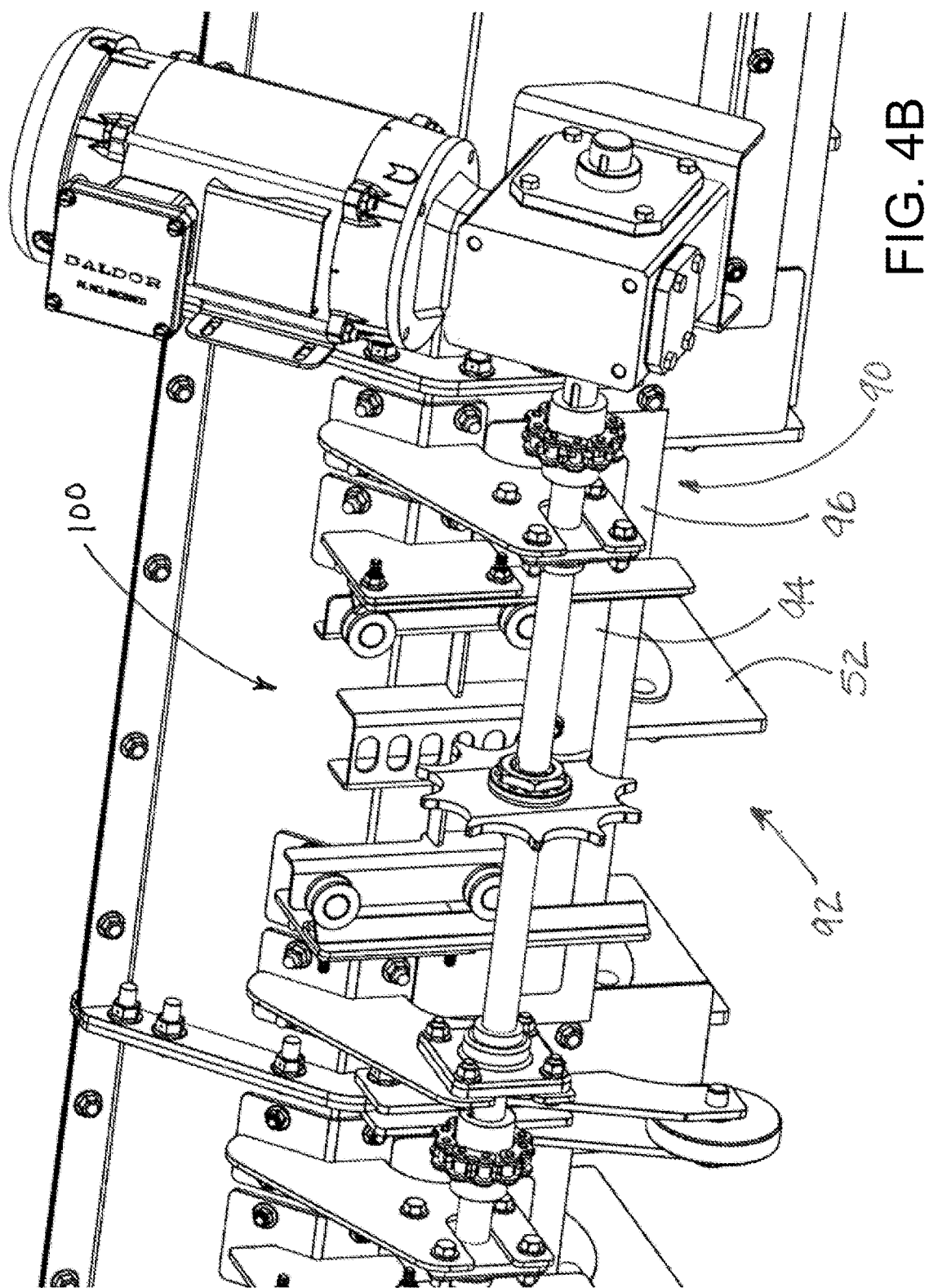
FIG. 4B is a schematic enlarged perspective view of a portion of the illustrative bin sweep apparatus embodiment of FIG. 1, with the movable section in the raised position, according to an illustrative embodiment.
Figure 5:
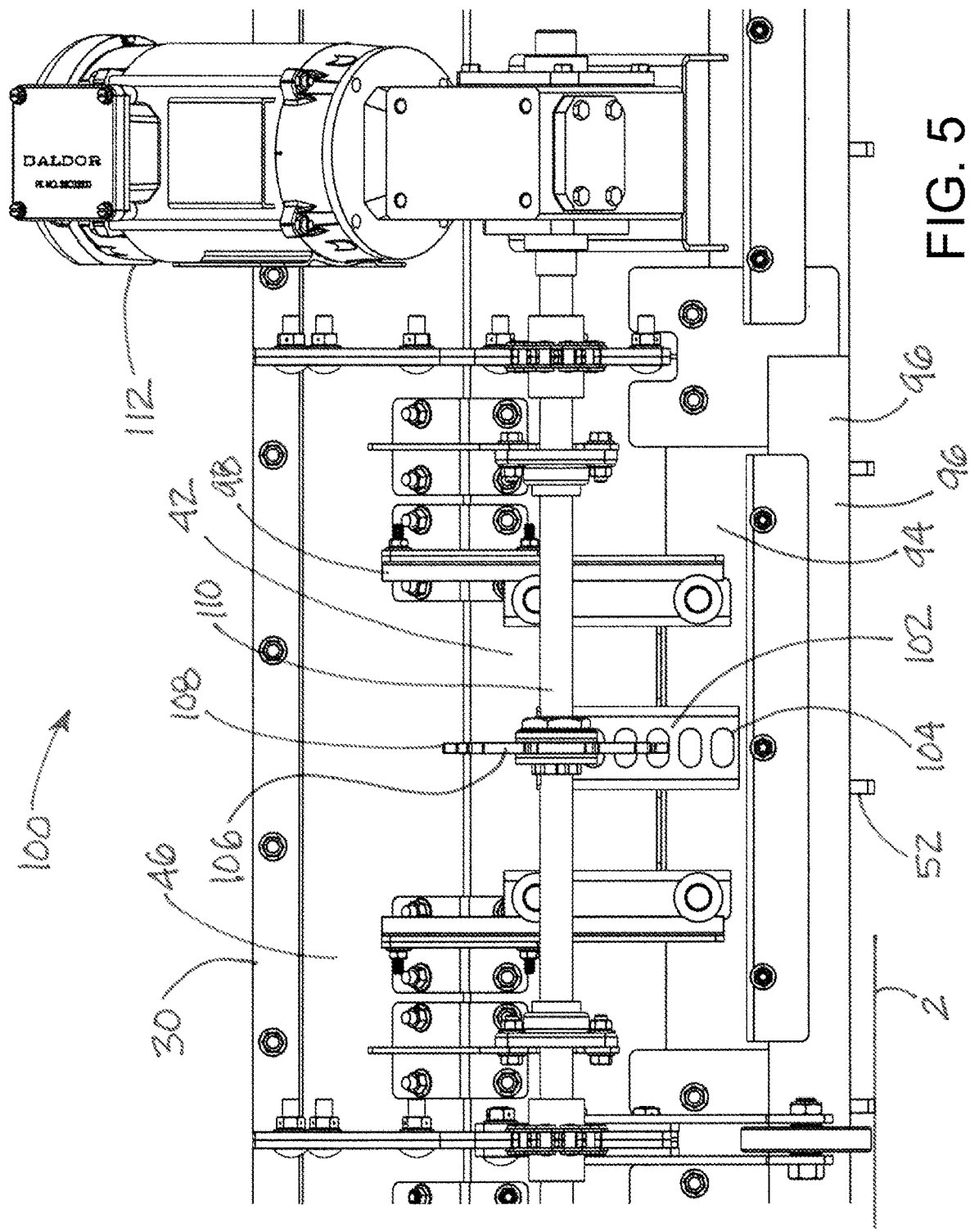
FIG. 5 is a schematic enlarged rear view of a portion of the illustrative bin sweep apparatus embodiment of FIG. 1, according to an illustrative embodiment.
Figure 6:
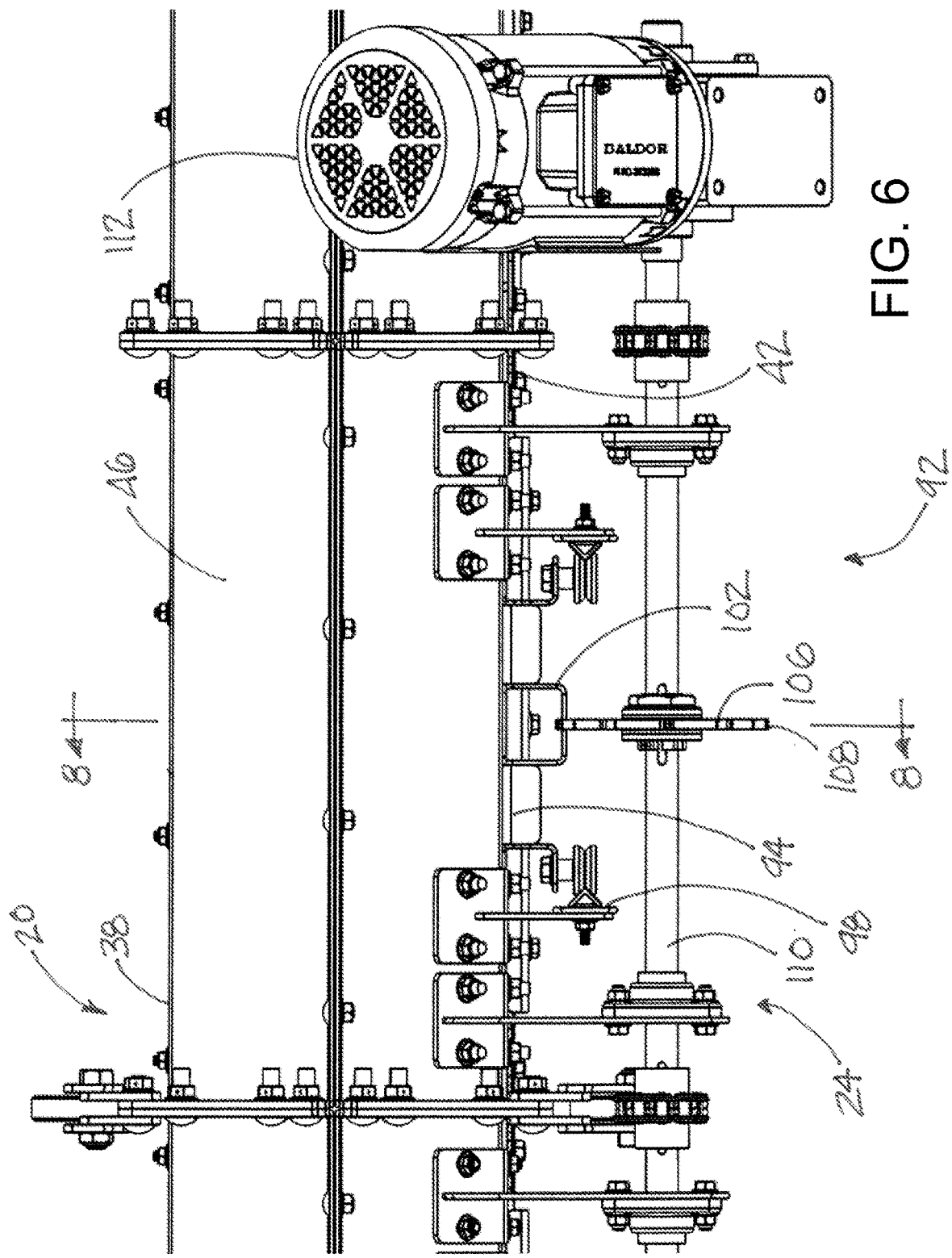
FIG. 6 is a schematic enlarged top view of a portion of the illustrative bin sweep apparatus embodiment of FIG. 1, according to an illustrative embodiment.
Figure 7:
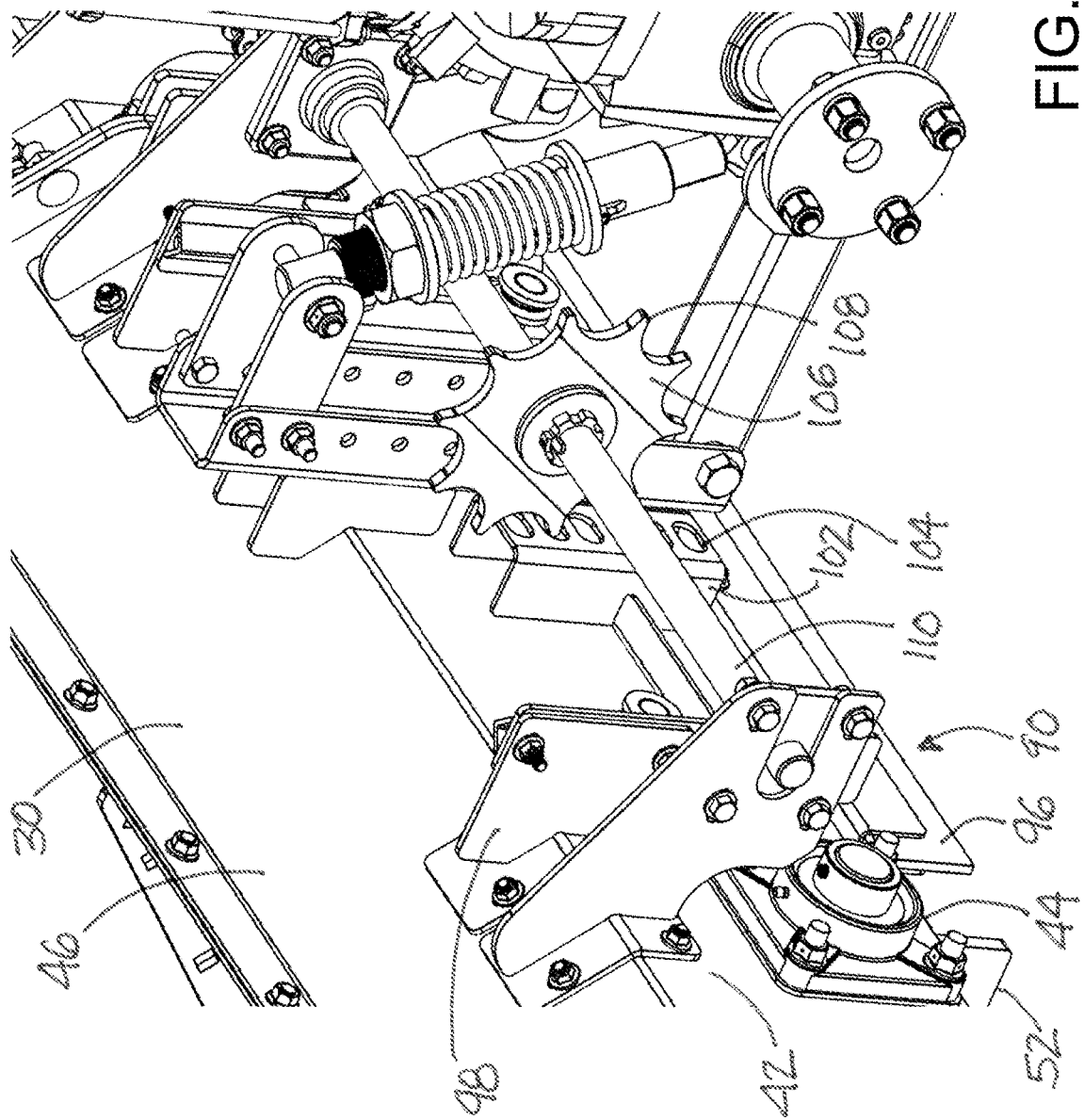
FIG. 7 is an additional schematic enlarged perspective view of a portion of the illustrative bin sweep apparatus embodiment of FIG. 1, with a wheel removed to reveal detail.
Figure 8:
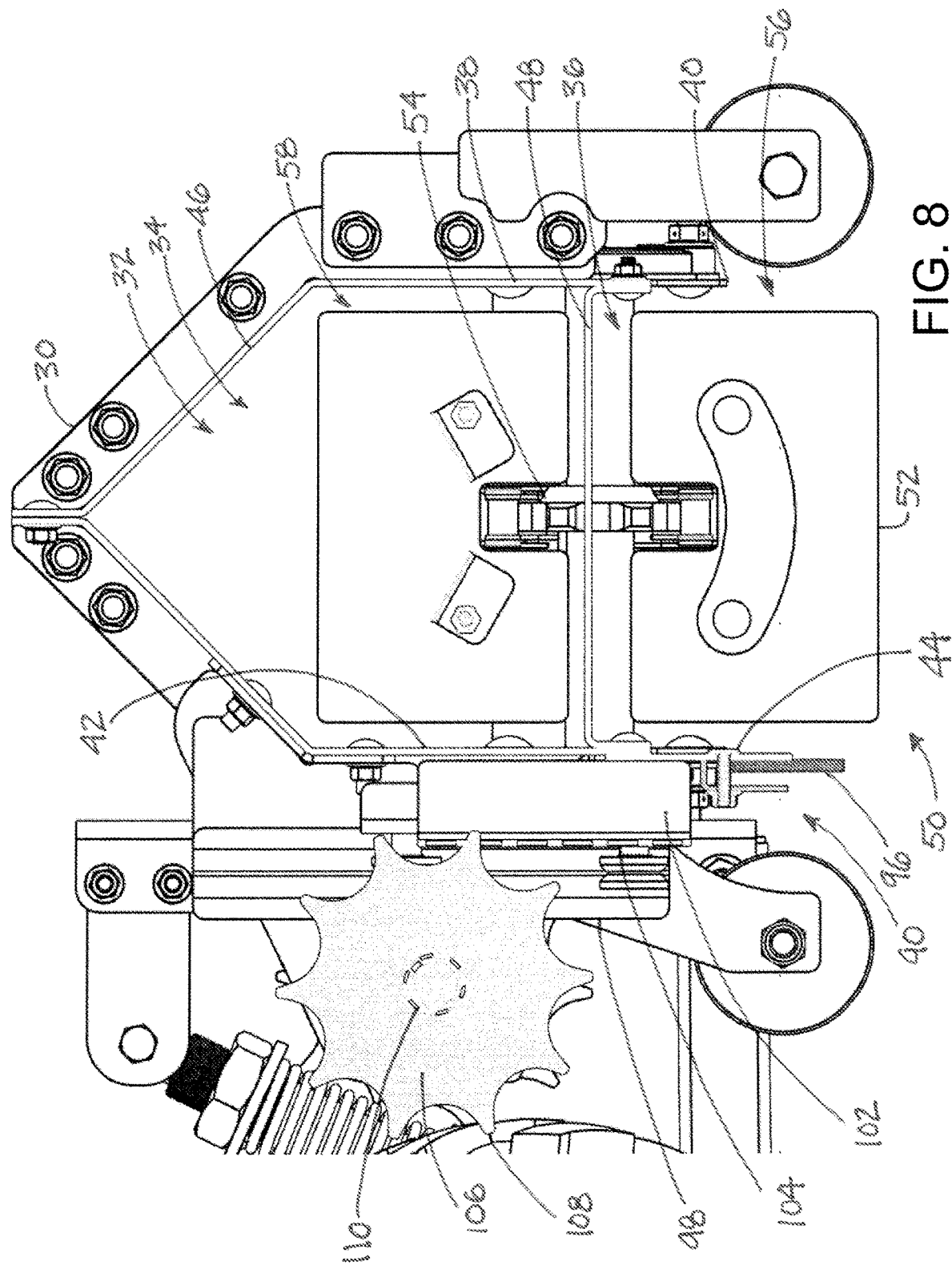
FIG. 8 is a schematic sectional view of the illustrative bin sweep apparatus embodiment of FIG. 1 taken in a lateral plane 8-8 of FIG. 6.
Figure 9:
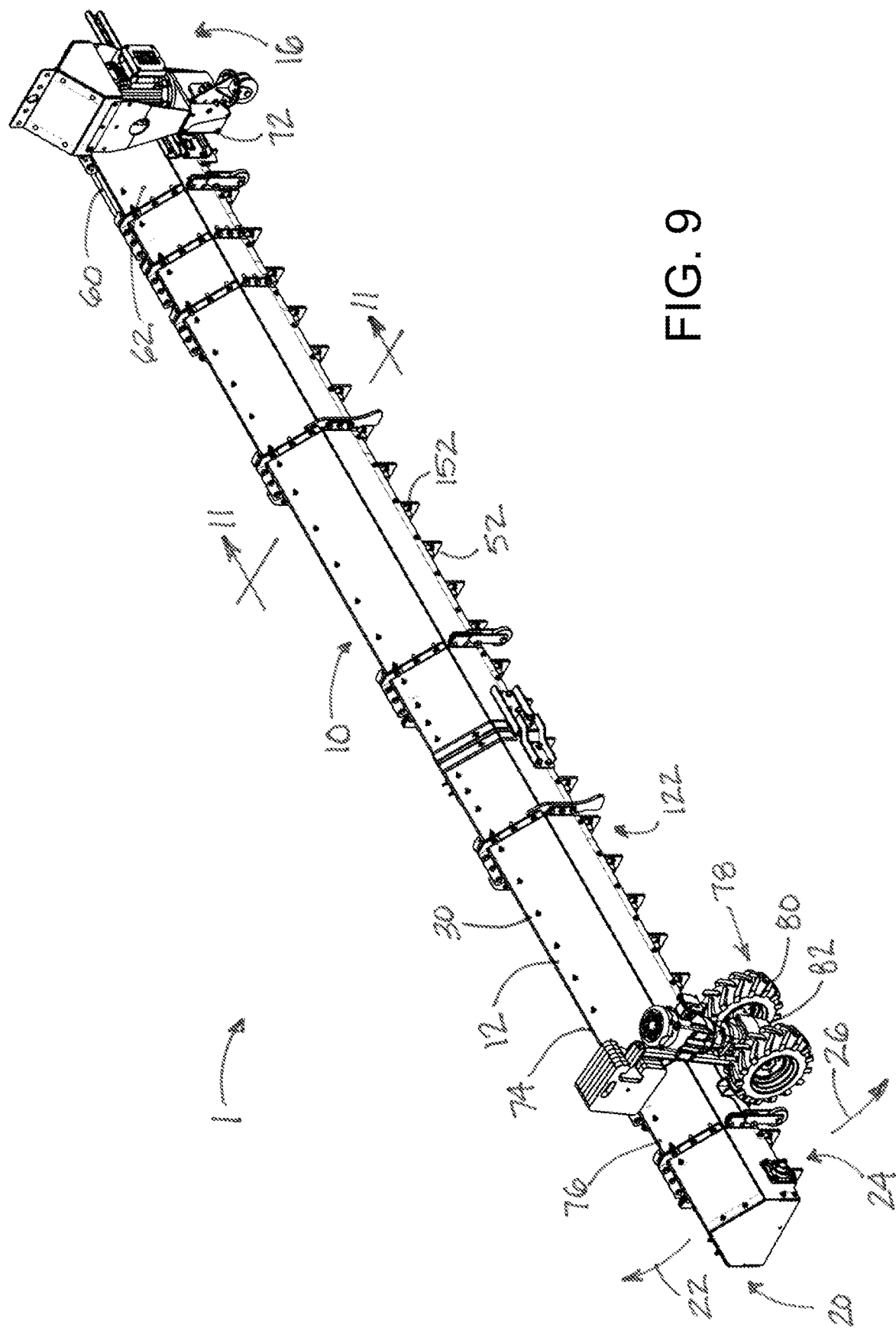
FIG. 9 is a schematic perspective view of another illustrative embodiment of the new bin sweep apparatus which is effective in two directions of movement, according to the present disclosure.
Figure 10:
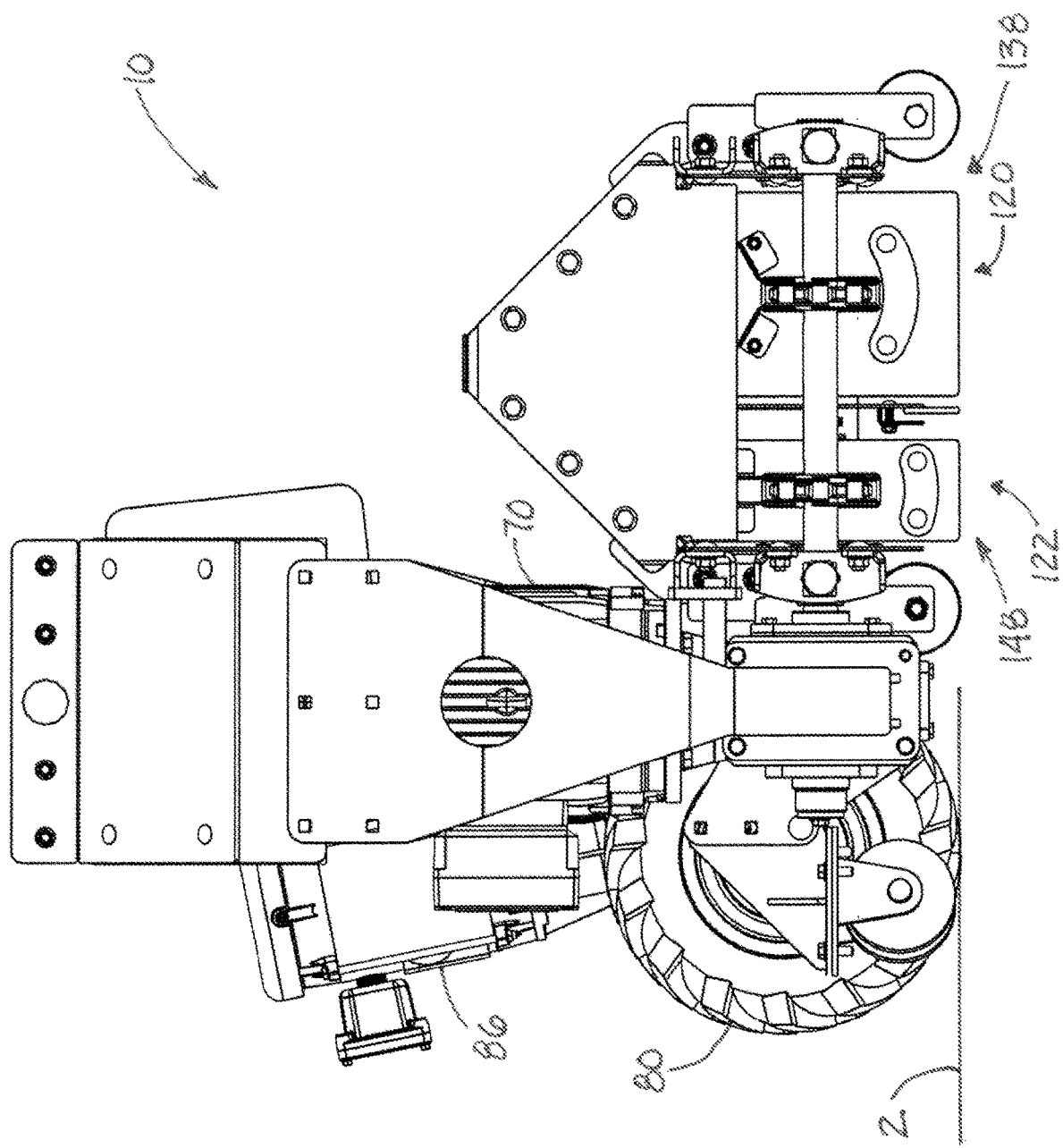
FIG. 10 is a schematic end view of the illustrative bin sweep apparatus embodiment of FIG. 9.
Figure 11:
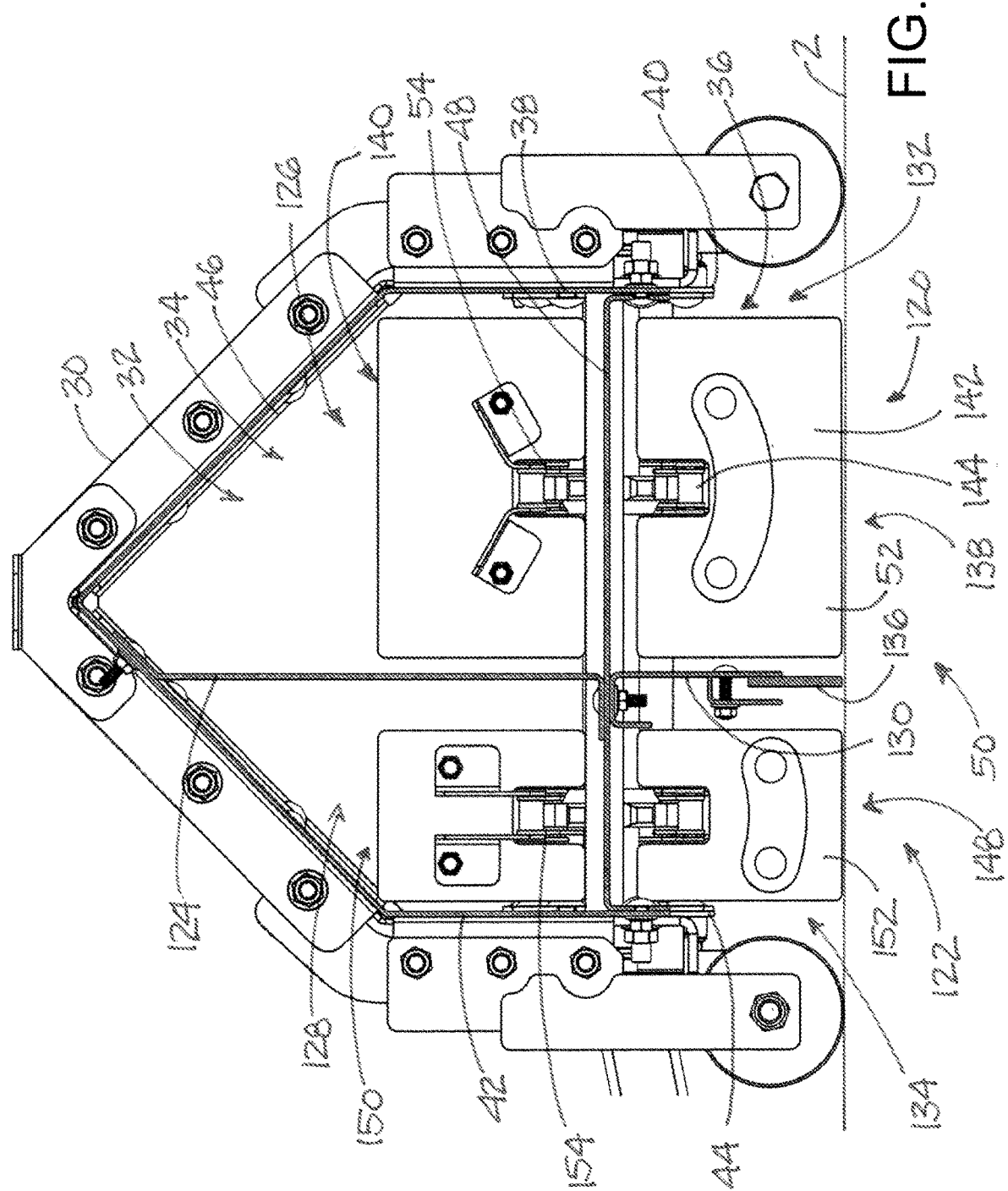
FIG. 11 is a schematic sectional view of the illustrative bin sweep apparatus embodiment of FIG. 9 taken in a lateral plane 11-11 of FIG. 9.

With reference now to the drawings, and in particular to FIGS. 1 through 12 thereof, a new bin sweep apparatus effective in two directions of movement embodying the principles and concepts of the disclosed subject matter will be described.

The applicants have recognized that storage bin sweep apparatus are typically optimized for one (forward) direction of movement across the floor surface of the bin during sweep operations, whether the movement be rotational in a circular bin or translational in a bin of a different shape, such as rectangular.

In general, a bin sweep apparatus is designed to permit particles to enter the front or forward side of the sweep apparatus through a low opening in the forward wall of the housing. To maximize the effectiveness of the particle capture and movement, the particles are substantially entirely blocked from moving out of the rear of the housing by a rearward wall of the housing that extends down to the bin floor surface. Typically, a flexible floor sweep member extends down from the housing to contact the floor surface to further close any gap between the sweep housing and the floor surface. Conversely, the rearward wall and the floor sweep member block movement of the particles into the housing if the sweep apparatus were to be moved in reverse direction.

The applicants also recognized that, for much of the operation of emptying the particulate contents of the bin, a bin sweep apparatus optimized for a single direction of movement during sweep operation is not disadvantageous. The applicants have also recognized, however, that in the final "cleanup" sweep operation to remove the last remnants of the contents located in limited or isolated areas of the bin, movement of the bin sweep to those isolated areas of particles to engage the particles is necessary while traversing intervening areas that may have few or no particles to move.

For conventional bin sweeps design for a single direction of movement during sweep operation, such cleanup operations may often require traversing great distances of the bin floor just to reach those isolated areas of particles, even if those areas are somewhat close to, but rearward of, the present location of the sweep apparatus. For example, a bin sweep apparatus in a circular bin may be required to traverse almost an entirety of the circumference of the bin floor surface to reach and engage particles that may not be too far rearward of the current location of the sweep apparatus.

The applicants have conceived of a system which includes a bin sweep apparatus which is able to effectively and usefully engage and move particles on the bin floor surface while the sweep apparatus is moving in either of two directions, such as in a rearward or secondary direction, or in a direction opposite of the forward or primary direction of movement of the sweep apparatus during normal operation. The applicants have developed different approaches to implementing this system, including utilizing movable elements to permit particles to move beneath the sweep apparatus when the apparatus moves rearwardly, and utilizing additional elements to engage particles when the apparatus moves rearwardly.

Aspects of the disclosure include a system 1 for moving particles across a floor surface 2 of a storage bin. An illustrative application of the system 1 is in a grain storage bin in which the particles are grain, although other applications of the system may be utilized. In the illustrative application, the floor surface 2 of the storage bin has a periphery or peripheral region and a central area or region, and a sump or opening in the floor surface may be located at the central area for receiving the particles when emptying of the contents of the bin is desired. Illustratively, the periphery may be substantially circular and the central area may be substantially centered with respect to the periphery. The system 1 may be utilized for moving the particles toward the central area (e.g., to the sum) from locations between the periphery and the central area.

The system may include a bin sweep apparatus 10 including at least two units 12 which may be arranged in a linear array with an inboard end 16 for locating toward to the central area of the bin (such as adjacent to the sump) (such as adjacent to the sump and an outboard end 18 for locating toward the periphery of the bin. The two or more units 12 may be connected together to form the sweep apparatus, and the units may be removably connected together such that the number of units included in the apparatus 10 may be increased or decreased to adjust the length of the apparatus to approximately correspond to the distance between the central area and the periphery of the bin floor surface. The sweep apparatus 10 may have a forward side 20 oriented toward a primary direction 22 of movement for the sweep apparatus during operation and a rearward side 24 oriented away from the primary direction of movement, and toward a secondary direction 26 of movement. In illustrative embodiments, the primary direction of movement may be in a first arcuate direction and the secondary direction of movement being in a second arcuate direction, with the arcuate directions being generally opposite of each other (e.g., counterclockwise versus clockwise). In this description, the use of the term "forward" generally reflects the orientation of the elements described when the sweep apparatus is moving in the primary direction 22 and reflects the primary or more usual more usual or common operation of the apparatus 10 in the primary direction. Relatedly, the use of the term "rearward" also generally reflects the orientation of the elements described when the sweep apparatus is moving in the primary direction.

In embodiments, the sweep apparatus 10 may include a housing segment 30 for each of the two or more units, and each housing segment may have an interior 32 and also may define an upper space 34 and a lower space 36 of the interior. The housing segment 30 may comprise a forward wall 38 which is positioned toward the forward side 20 of the apparatus 10 and may have a forward wall lower edge 40. The segment 30 may further include a rearward wall 42 which is positioned toward the rearward side 24 of the apparatus 10 and may have a rearward wall lower edge 44. An upper wall 46 of the segment 30 may extend between the forward 42 and rearward 44 walls. The upper wall 46 may be located at a top of the housing segment 30 and may have a pair of diverging upper wall portions extending downwardly and outwardly to the respective forward and rearward walls. The housing segment 30 may also include an intermediate wall 48 that extends between the forward 38 and rearward 42 walls, and may be positioned below the upper wall and may have a substantially horizontal orientation.

The bin sweep apparatus 10 may further include a paddle sweep assembly 50 associated with the two or more units 12 to engage and move particles on the bin floor surface. The paddle sweep assembly 50 may include a plurality of interconnected paddles 52 movable in a succession on a path along at least a portion of the length of the sweep apparatus between the inboard 16 and outboard 18 ends, and the path of the plurality of paddles is typically elongated along an axis extending between the ends.

The sweep assembly 50 may also include an endless loop member 54 which has the plurality of paddles mounted thereon at spaced locations along the extent of the endless loop member. In some embodiments, the endless loop member 54 may comprise a series of interconnected links, and illustratively the interconnected links may include a plurality of chain links.

The endless loop member with the mounted paddles may include an inbound extent 56 which moves toward the inboard end 16 during operation of the sweep apparatus, and an outbound extent 58 which moves toward the outboard end during operation of the apparatus 10. Further, the paddles of the inbound extent 56 may be positioned toward the floor surface 2 for contacting particles on the surface to move the particles toward the inboard end 16. Conversely, the paddles of the outbound extent 58 may be oriented upwardly and away from the floor surface 2 so as to be out of contact with the floor surface and any particles thereon. The inbound extent 56 is located below the outbound extent 58, and the inbound extent may be located in the lower space 36 of the housing segment and the outbound extent may be located in the upper space 34 of the segment 30. It will be appreciated that the paddles and portions of the endless loop continuously move between the inbound 56 and outbound 58 extents during operation of the sweep assembly 50.

The bin sweep apparatus 10 may include a power unit 60 which carries a portion of the endless loop member 54 and the paddles mounted thereon, and may be configured to move the loop member and the paddles along the sweep apparatus. The power unit 60 may be positioned toward the inboard end 16 of the sweep apparatus, and may be positioned at the inboard end, although other positions along the array of units are possible. In embodiments, the power unit 60 may include a first one 62 of the housing segments, and a first rotatable drive member on which a portion of the loop member 54 is engaged. The first rotatable drive member may be mounted on the first housing segment 62 and located in the interior of segment 62. Illustratively, the first rotatable drive member may be embodied as a first sprocket. The power unit 60 may further include a first rotatable shaft which is rotatably mounted on the first housing segment 62 and which has the first rotatable drive member mounted thereon such that the first rotatable drive member rotates as a unit with the first rotatable shaft.

The power unit 60 may further have a motor assembly 68 which is configured to move the loop member 54 with respect to the first housing segment 62, and may be mounted on the housing segment 62. The motor assembly 68 may comprise a motor 70 for rotating the first rotatable shaft and the first rotatable drive member. Illustratively, a gearset 72 may connect the motor 70 to the rotatable shaft to transfer rotational motion from the motor to the shaft and the first rotatable drive member.

The bin sweep apparatus 10 may also include a drive unit 74 which carries a portion of the endless loop member 54 and the paddles mounted thereon, and may be configured to move the sweep apparatus 10 with respect to the floor surface 2 below the apparatus 10. The drive unit 74 may be positioned toward the outboard end 18 of the sweep apparatus, such as at the outboard end, although other positions along the array of units are possible. The drive unit 74 may include a second one 76 of the housing segments 40, and a surface engaging element 78 which is configured to engage the floor surface below the sweep apparatus 10 to move the apparatus 10 with respect to the surface. The surface engaging element 78 may be mounted on the second housing segment 76 and comprise at least one surface engaging wheel 80, and in illustrative embodiments, a pair of wheels. The wheel or wheels may be rotatable about a substantially horizontal axis which may be oriented substantially parallel to the length of the apparatus 10 and the axis of the plurality of paddles.

In embodiments, the drive unit 74 may comprise a drive train 82 which may include a support 84 supportively attached to the second housing segment 76, a drive motor 86 supported on the support 84, and a gearbox 88 configured to transfer rotation from the drive motor 86 to the surface engaging wheel or wheels 80. Optionally, in some embodiments, power for driving the surface engaging element 78 may be drawn from the paddle sweep assembly via the loop member 54.

In some embodiments of the disclosure, such as are depicted in FIGS. 1 through 8, the rear side of one or more of the housing segments 30 of the units may have a section 90 which is movable with respect to the rearward wall 42. The section 90 may be movable between a lowered position (see, e.g., FIG. 4A) and a raised position (see, e.g., FIG. 4B), and the lowered position may be characterized by the section being positioned relatively closer to the floor surface 2 and the raised position may be characterized by the section being positioned relatively further away from the surface 2. The section 90 may be positioned toward the rearward wall lower edge 44. The section 90 may form a lower boundary of the rearward wall of the housing segment 30, and the lowered position of the section may place or position the lower boundary closer to the floor surface and the raised position of the section may place or position the lower boundary further away from the floor surface.

In general, the lowered position of the section 90 may be associated with movement of the sweep apparatus 10 in the primary direction 22 of movement, and the raised position of the section may be associated with movement of the apparatus 10 in the secondary direction 26 of movement. The raised position of the section 90 may permit particles on the floor surface to move under the rearward wall 42, and consequently the raised position of the section 90 may permit particles on the floor surface to move into the lower space 36 of the housing segments during movement of the bin sweep apparatus in the secondary direction 26 of movement. The lowered position of the section 90 may block particles on the floor surface 2 from moving under the rearward wall 42, and as a result the lowered position of the section may block particles on the surface 2 from moving out of the lower space 36 of the housing segments during movement of the sweep apparatus in the primary direction of movement. Conversely, the lowered position of the section 90 may block particles from moving under the rearward wall 42 and into the lower space 36 of the segments 30 during movement of the sweep apparatus 10 in the secondary direction 26 of movement.

In some embodiments, each of the housing segments 30 of the sweep apparatus 10 may include a movable section 90, while in embodiments fewer than all of the segments 30 of the apparatus 10 may include a movable section 90. One or more of the housing segments 30 may include a movable wall assembly 92, and the assembly 92 may include a movable wall member 94 which is positioned adjacent to the rearward wall 42 and the rearward wall lower edge 44. The movable wall member 92 may be moved between the raised position and the lowered position. The movable wall member 94 may be elongated in a substantially horizontal direction, and may extend substantially parallel to the rearward wall 42. The movable wall member 94 may have a bottom edge for positioning adjacent to the floor surface 2 in the lowered position of the movable wall member, and may be spaced upwardly from the surface to in the raised position of the wall member 94. In embodiments, a sweep edge element 96 may be mounted on the bottom edge of the wall member 94.

The movable wall assembly 92 may further include at least one guide 98 for guiding movement of the movable wall member 94, such as between the raised and lowered positions. Illustratively, a plurality of the guides 98 may be mounted on the housing segment at horizontally spaced locations to engage the wall member 94 at locations along the length of the member 94. Illustratively, the guide or guides 98 may be mounted on the rearward wall 42.

The movable wall assembly may further include a movement mechanism 100 configured to move the movable wall member 94 between the raised and lowered positions. The movement mechanism 100 may comprise an actuation member 102 mounted on the movable wall member 94 such that the actuation member and the wall member move as a unit. In embodiments, the actuation member 94 may have a plurality of recesses 104 arranged in a substantially vertically oriented array. Further, the movement mechanism 100 may comprise a wheel 106 which has a plurality of peripheral protrusions 108 that are configured to engage at least one recess 104 of the plurality of recesses on the actuation member 102. In operation of the movement mechanism 100 to move the wall member 94, the wheel 106 may be rotated such that engagement of the peripheral protrusions 108 with the plurality of recesses on 104 cause movement of the actuation member and the wall member with respect to the rearward wall 42. The wheel 106 may be mounted on an actuation shaft 110 of the movement mechanism, and the shaft 110 may be rotatably mounted on the housing segment 30. The actuation shaft 110 may extend in a substantially horizontal orientation and may be rotatable about a substantially horizontal axis, and rotation of the actuation shaft may thus cause rotation of the wheel 106, which in turn engages the recesses of the actuation member to move the wall member 94 with respect to the stationary portions of the rearward wall 42. Further, the movement mechanism 100 may also comprise an actuation motor 112 which is configured to rotate the actuation shaft 110. The actuation motor 112 may be mounted on the housing segment 30, and may act through a gearbox to rotate the actuation shaft.

In embodiments of the type shown in FIGS. 1 through 8, operation of the bin sweep apparatus 10 in the primary direction 22 of movement may have the section 90 in, or moved into, the lowered position to help block particles from moving past the rearward wall 42 and the rear of the sweep apparatus. Operation of the sweep apparatus 10 in the secondary direction 26 may have the section 90 in, or moved into, the raised position to permit particles to move from the rearward side 24 past the rearward wall 42 to be reached and engaged by the paddles 52 of the paddle sweep assembly.

In some further embodiments of the disclosure, such as are depicted in FIGS. 9 through 12, the paddle sweep assembly 50 may be augmented to include a forward paddle train 120 and a rearward paddle train 122, with the forward paddle train being located relatively forwardly of the rearward paddle train and the rearward paddle train being located relatively rearwardly of the forward paddle train. Thus, the forward paddle train 120 is relatively closer to the forward side 20 of the sweep apparatus 10, and the rearward paddle train 122 is relatively closer to the rearward side 24 of the apparatus 10.

In the illustrative embodiments, the housing segment 30 may additionally include an upper separator wall 124 which may divide the upper space 34 of the interior of the segment 30 into a forward upper subspace 126 and a rearward upper subspace 128. The upper separator wall 124 may extend upwardly from the intermediate wall 48, and may extend to the upper wall 46. The upper separator wall 124 may be substantially vertically oriented, and extend in the longitudinal direction of the housing segment 30 such that the sub spaces 126 and 128 of each of the segments may be in communication with each other.

The housing segment 30 may also include a lower separator wall 130 which may divide the lower space 36 of the interior of the housing segment 30 into a forward lower subspace 132 and a rearward lower subspace 134. The lower separator wall 130 may extend downwardly from the intermediate wall 48, and may extend toward the floor surface 2 below the sweep apparatus 10. A sweep edge strip 136 may be mounted on the lower separator wall 130 and extend downwardly from the wall 130 toward the floor surface 2 to be positioned closely adjacent to, and potentially contact, the surface 2, to restrict movement of particles beneath the separator wall 130 and between the forward 132 and rearward 134 lower subspaces. Further, a gap between the forward wall lower edge 40 and the floor surface and a gap between the rearward wall lower edge 44 of the rearward wall and the floor surface may be substantially equal in size or magnitude, such that the movement of particles into the forward lower subspace 132 from the forward side 20 and movement of particles into the rearward lower subspace 134 from the rearward side 24 is permitted and may be substantially unimpeded.

In embodiments such as shown in FIGS. 9 through 12, the forward paddle train 120 may have a forward inbound extent 138 and a forward outbound extent 140, with the forward inbound extent being located in the forward lower subspace 132 and the forward outbound extent being located in the forward upper subspace 126. Illustratively, the forward paddle train 120 may include a set of forward paddles 142, a forward endless loop member 144 having the forward paddles mounted thereon at spaced locations along the forward endless loop member, and a forward rotatable drive member engaging the forward endless loop member. The forward rotatable drive member when 46 may be mounted on the first rotatable shaft of the power unit 60.

In embodiments, the rearward paddle train 122 may have a rearward inbound extent 148 and a rearward outbound extent 150, with the rearward inbound extent being located in the rearward lower subspace 134 and the rearward outbound extent being located in the rearward upper subspace 128. Illustratively, the rearward paddle train 122 may include a set of rearward paddles 152, a rearward endless loop member 154 having the rearward paddles mounted thereon at spaced locations along the rearward endless loop member, and a rearward rotatable drive member engaging the rearward endless loop member. The rearward rotatable drive member may be mounted on the first rotatable shaft of the power unit.

In some embodiments, the paddles 142 of the forward paddle train 120 may have greater capacity to move particles when compared than the paddles 152 of the rearward paddle train 122. Illustratively, the paddles 142 of the forward paddle train may be larger in size, and the larger size may be provided by the paddles 142 may be wider than the paddles 152 of the rearward paddle train (see, e.g., FIG. 11). In such embodiments, the position of the separator wall or walls may be shifted accordingly to accommodate different widths of the paddles 142 and 152. Other approaches to variation in the capacities may also be utilized to reflect the advantageousness of having a greater movement capacity in the forward direction of movement as compared to the rearward direction of movement.

In embodiments of the type shown in FIGS. 9 through 12, operation of the bin sweep apparatus 10, including the power unit 60 of the sweep apparatus, operates the paddle sweep assembly 50 so that the forward paddle train 120 and the rearward paddle train 122 both move, and may move simultaneously. The movement of both the forward paddle train and the rearward paddle train may occur regardless of the direction of movement of the sweep apparatus. The paddle train that is opposite of the direction of the sweep apparatus' movement may not engage any significant amount of particles, although the paddles of train opposite of the movement direction may function to catch particles that are not moved by the paddles of the train in the direction of movement and that are not blocked or impeded by the lower separator wall 124 and any sweep edge strip 136.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for moving particles across a floor surface of a storage bin, the system comprising:
    a bin sweep apparatus including at least two units arranged in a linear array with an inboard end for locating toward a central area of the bin and an outboard end for locating toward a periphery of the bin, the sweep apparatus having a forward side for orienting toward a primary direction of movement for the sweep apparatus and a rearward side for orienting toward a secondary direction of movement for the sweep apparatus, the secondary direction of movement being oriented away from the primary direction of movement, the sweep apparatus comprising:
        a housing segment for each of the at least two units, the housing segment of at least one of the units comprising a forward wall positioned toward the forward side of the bin sweep apparatus and a rearward wall positioned toward the rearward side of the bin sweep apparatus; and
        a paddle sweep assembly carried on the housing segments of the at least two units, the paddle sweep assembly comprising
            a plurality of interconnected paddles movable in a succession on a path along at least a portion of the sweep apparatus between the inboard and outboard ends;
            an endless loop member having the plurality of paddles mounted thereon at spaced locations along the endless loop member;
            wherein the endless loop member with mounted paddles includes an inbound extent moving toward the inboard end of the bin sweep apparatus and an outbound extent moving toward the outboard end of the bin sweep apparatus, the inbound extent contacting particles to move the particles toward the inboard end and the outbound extent being out of contact with the particles, the inbound extent being located below the outbound extent;
        wherein the sweep apparatus is effective to move particles across the floor surface of a bin in the primary direction of movement of the sweep apparatus and in the secondary direction of movement of the sweep apparatus.

2. The system of claim 1 wherein the primary direction of movement is in a first arcuate direction and the secondary direction of movement is in a second arcuate direction.

3. The system of claim 1 wherein the rear side of the at least one of the housing segments of the at least two units has a section being movable with respect to the rearward wall, the section being movable between a lowered position and a raised position, the lowered position being characterized by the section being positioned relatively closer to the floor surface and the raised position being characterized by the section being positioned relatively further from the floor surface.

4. The system of claim 3 wherein the lowered position of the section is associated with movement of the sweep apparatus in the primary direction of movement and the raised position of the section is associated with movement of the sweep apparatus in the secondary direction of movement.

5. The system of claim 3 wherein the section forms a lower boundary of the rearward wall of the housing segment, the lowered position of the section placing the lower boundary closer to the floor surface and the raised position of the section placing the lower boundary further away from the floor surface.

6. The system of claim 5 wherein the raised position of the section is configured to permit particles on the floor surface to move under the rearward wall and into a lower space of the housing segment during movement of the sweep apparatus in the secondary direction of movement.

7. The system of claim 6 wherein the lowered position of the section is configured to block particles on the floor surface from moving under the rearward wall and out of the lower space of the housing segment during movement of the sweep apparatus in the primary direction of movement.

8. The system of claim 3 wherein each of the housing segments of the at least two units has a movable section.

9. The system of claim 3 wherein the at least one housing segment has a movable wall assembly including:

a movable wall member positioned adjacent to a rearward wall lower edge of the rearward wall, the movable wall member being moved between the raised and lowered positions; and a movement mechanism configured to move the movable wall member between the raised and lowered positions.

10. The system of claim 1 wherein the paddle sweep assembly includes paddles includes a forward paddle train and a rearward paddle train, the forward paddle train being located relatively forwardly of the rearward paddle train and the rearward paddle train being located relatively rearwardly of the forward paddle train.

11. The system of claim 10 wherein a gap between a forward wall lower edge of the forward wall and the floor surface and a gap between the rearward wall lower edge of the rearward wall and the floor surface are substantially equal in size.

12. The system of claim 10 wherein the housing segment of the at least one of the units has an interior, and the housing defining an upper space and a lower space of the interior; and wherein the housing segment additionally includes a lower separator wall positioned between a portion of the forward paddle train and a portion of the rearward paddle train, the lower separator wall extending toward the floor surface below the sweep apparatus and being configured to resist movement of particles on the floor surface past the lower separator wall.

13. The system of claim 12 wherein the lower separator wall has a sweep edge strip mounted thereon and extending from the lower separator wall down toward the floor surface.

14. The system of claim 12 wherein the lower separator wall divides the lower space of the interior of the housing segment into a forward lower subspace and a rearward lower subspace, the lower separator wall extending toward the floor surface below the sweep apparatus and being configured to resist movement of particles on the floor surface from a first one of the lower subspaces to a second one of the lower subspaces.

15. The system of claim 14 wherein the forward paddle train is at least partially positioned in the forward lower subspace and the rearward paddle train is located in the rearward lower subspace.

16. The system of claim 10 wherein the housing segment of the at least one of the units has an interior, and the housing defining an upper space and a lower space of the interior; and wherein the housing segment additionally includes an upper separator wall positioned between a portion of the forward paddle train and a portion of the rearward paddle train, the upper separator wall dividing the upper space of the interior of the housing segment into a forward upper subspace and a rearward upper subspace.

17. The system of claim 10 wherein the housing segment of the at least one of the units has an interior, and the housing defining an upper space and a lower space of the interior;

wherein the forward paddle train has a forward inbound extent and a forward outbound extent, the forward inbound extent being located in a forward lower subspace of the lower space and the forward outbound extent being located in a forward upper subspace of the upper space; and wherein the rearward paddle train has a rearward inbound extent and a rearward outbound extent, the rearward inbound extent being located in a rearward lower subspace of the lower space and the rearward outbound extent being located in a rearward upper subspace of the upper space.

18. The system of claim 10 wherein the forward paddle train includes a set of forward paddles and a forward endless loop member having the forward paddles mounted thereon at spaced locations along the forward endless loop member; and wherein the rearward paddle train includes a set of rearward paddles and a rearward endless loop member having the rearward paddles mounted thereon at spaced locations along the rearward endless loop member.

* * * * *